US012652722B2

(12) United States Patent
Baek et al.

(10) Patent No.: US 12,652,722 B2
(45) Date of Patent: Jun. 9, 2026

(54) METHOD AND APPARATUS FOR PERFORMING RANDOM ACCESS AND DISCONTINUOUS RECEPTION IN A WIRELESS COMMUNICATION SYSTEM

(71) Applicant: Samsung Electronics Co., Ltd., Suwon-si (KR)

(72) Inventors: Sangkyu Baek, Suwon-si (KR); Anil Agiwal, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 18/183,335

(22) Filed: Mar. 14, 2023

(65) Prior Publication Data

US 2023/0300941 A1    Sep. 21, 2023

(30) Foreign Application Priority Data

Mar. 15, 2022    (KR) ........................ 10-2022-0032105

(51) Int. Cl.
*H04W 76/28*        (2018.01)
*H04L 1/1812*        (2023.01)
(Continued)

(52) U.S. Cl.
CPC ........... *H04W 76/28* (2018.02); *H04L 1/1812* (2013.01); *H04W 72/11* (2023.01);
(Continued)

(58) Field of Classification Search
CPC ... H04L 1/1812; H04L 1/1822; H04L 1/1851; H04L 1/1883; H04W 76/28;
(Continued)

(56) References Cited

U.S. PATENT DOCUMENTS

| | | | |
|---|---|---|---|
| 2021/0045100 A1* | 2/2021 | Park ...................... | H04L 1/1854 |
| 2022/0077993 A1 | 3/2022 | Hong et al. | |
| 2023/0097118 A1* | 3/2023 | Tseng ................... | H04W 24/08 |
| | | | 370/329 |

FOREIGN PATENT DOCUMENTS

| | | |
|---|---|---|
| KR | 10-2022-0152735 A | 11/2022 |
| WO | 2021/041017 A1 | 3/2021 |
| WO | 2021/067921 A1 | 4/2021 |

OTHER PUBLICATIONS

Published Jan. 26, 2021—discloses Unicast invariably requires PDCCH indicating DL and C-RNTI as basis for PDCCH. (Year: 2021).*

(Continued)

*Primary Examiner* — Khalid W Shaheed
(74) *Attorney, Agent, or Firm* — Jefferson IP Law, LLP

(57)        ABSTRACT

The disclosure relates to a 5th generation (5G) or 6th generation (6G) communication system for supporting a higher data transmission rate. A method performed by user equipment (UE) in a wireless communication system is provided. The method includes receiving, from a base station (BS), a unicast related downlink signal, in case that a unicast discontinuous reception (DRX) and a multicast DRX are configured, stopping a unicast DRX retransmission timer based on the received unicast related downlink signal, and stopping a multicast DRX retransmission timer based on the received unicast related downlink signal.

12 Claims, 13 Drawing Sheets

(51) Int. Cl.
    *H04W 72/11*      (2023.01)
    *H04W 72/231*     (2023.01)
    *H04W 74/0833*    (2024.01)
    *H04W 74/0836*    (2024.01)

(52) U.S. Cl.
    CPC ...... *H04W 72/231* (2023.01); *H04W 74/0833*
              (2013.01); *H04W 74/0836* (2024.01)

(58) Field of Classification Search
    CPC . H04W 52/0216; H04W 72/23; H04W 72/11;
                    H04W 74/006
    See application file for complete search history.

(56)            References Cited

OTHER PUBLICATIONS

"Uplink Physical Layer Functions" as a chapter in the book "LTE-Advanced" by Sassan Ahmadi (Year: 2014).*
International Search Report dated Jun. 14, 2023, issued in International Patent Application No. PCT/KR2023/003416.
Oppo, Resolution proposals to Rapporteur Handled Open Issues in MAC CR, 3GPP TSG-RAN WG2 Meeting #117, R2-2202246, pp. 3-9, Feb. 14, 2022.
Samsung, Report of Offline 002: UP Open Issues, 3GPP TSG RAN WG2 Meeting #117, R2-2204015, Mar. 12, 2022.

* cited by examiner

410

| 2-Step RACH is allowed |
| --- |
| MBS1 - TMGI1<br>MBS2 - TMGI2 |

420

| 4-step RACH is allowed |
| --- |
| MBS3 - TMGI3<br>MBS4 - TMGI4<br>MBS5 - TMGI5 |

METHOD AND APPARATUS FOR PERFORMING RANDOM ACCESS AND DISCONTINUOUS RECEPTION IN A WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0032105, filed on Mar. 15, 2022, in the Korean Intellectual Property Office, the disclosure of which is incorporated by reference herein in its entirety.

BACKGROUND

1. Field

The disclosure relates to a method and an apparatus for performing random access and discontinuous reception in a wireless communication system.

2. Description of Related Art

5th generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement 6th generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for performing random access and discontinuous reception in a wireless communication system.

Additional aspects will be set forth in part in the description which follows and, in part, will be apparent from the description, or may be learned by practice of the presented embodiments.

In accordance with an aspect of the disclosure, a method performed by user equipment (UE) in a wireless communication system is provided. The method includes receiving, from a base station (BS), a unicast related downlink signal, in case that a unicast discontinuous reception (DRX) and a multicast DRX are configured, stopping a unicast DRX retransmission timer based on the received unicast related downlink signal, and stopping a multicast DRX retransmission timer based on the received unicast related downlink signal.

In accordance with another aspect of the disclosure, a user equipment (UE) in a wireless communication system is provided. The UE includes a transceiver and at least one processor coupled with the transceiver, the at least one processor is configured to receive, from a base station (BS), a unicast related downlink signal, in case that a unicast discontinuous reception (DRX) and a multicast DRX are configured, stop a unicast DRX retransmission timer based on the received unicast related downlink signal, and stop a multicast DRX retransmission timer based on the received unicast related downlink signal.

In accordance with another aspect of the disclosure, a method performed by base station (BS) in a wireless communication system is provided. The method includes transmitting, to user equipment (UE), a unicast related downlink signal, in case that a unicast discontinuous reception (DRX) and a multicast DRX are configured for the UE. Further, a unicast DRX retransmission timer is stopped based on the unicast related downlink signal being received, and a multicast DRX retransmission timer is stopped based on the received unicast related downlink signal.

In accordance with another aspect of the disclosure, a base station (BS) in a wireless communication system is provided. The BS includes a transceiver and a at least one processor coupled with the transceiver, and the at least one processor is configured to transmit, to user equipment (UE), a unicast related downlink signal, in case that a unicast discontinuous reception (DRX) and a multicast DRX are configured for the UE. Further, a unicast DRX retransmission timer is stopped based on the unicast related downlink signal being received, and a multicast DRX retransmission timer is stopped based on the received unicast related downlink signal.

The disclosure provides a method and an apparatus for performing random access and discontinuous reception in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
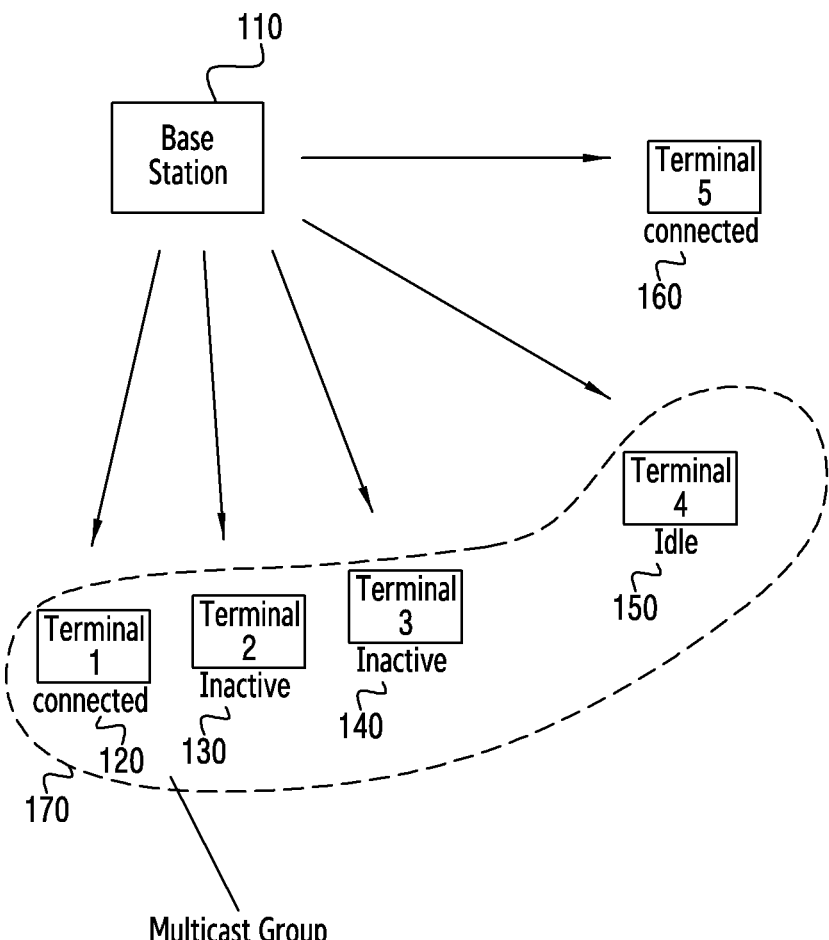
FIG. 1 is a diagram illustrating multicast and broadcast service (MBS) communication operations according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Advantages and features of the disclosure, and methods for achieving them will be clarified with reference to embodiments described below in detail together with the accompanying drawings. However, the disclosure is not limited to the embodiments disclosed below but may be implemented in various different forms, the embodiments are provided to only complete the scope of the disclosure and to allow those skilled in the art to which the disclosure pertains to fully understand a category of the disclosure, and the disclosure is solely defined within the scope of the claims. The same reference numeral refers to the same element throughout the specification.

At this time, it will be understood that each block of the process flowchart illustrations and combinations of the flowchart illustrations may be executed by computer program instructions. Since these computer program instructions may be mounted on a processor of a general purpose computer, a special purpose computer or other programmable data processing apparatus, the instructions executed by the processor of the computer or other programmable data processing equipment may generate means for executing functions described in the flowchart block(s). Since these computer program instructions may also be stored in a computer-usable or computer-readable memory which may direct a computer or other programmable data processing equipment to function in a particular manner, the instructions stored in the computer-usable or computer-readable memory may produce a manufacture article including instruction means which implement the function described in the flowchart block(s). Since the computer program instructions may also be loaded on a computer or other programmable data processing equipment, a series of operational steps may be performed on the computer or other programmable data processing equipment to produce a computer-executed process, and thus the instructions performing the computer or other programmable data processing equipment may provide steps for executing the functions described in the flowchart block(s).

In addition, each block may represent a portion of a module, a segment or code which includes one or more executable instructions for implementing a specified logical function(s). Also, it should be noted that the functions mentioned in the blocks may occur out of order in some alternative implementations. For example, two blocks shown in succession may in fact be executed substantially concurrently or the blocks may sometimes be executed in the reverse order depending on corresponding functionality.

At this time, the term '~unit' as used in the embodiment indicates software or a hardware component such as a field programmable gate array (FPGA) or an application-specific integrated circuit (ASIC), and '~unit' performs specific roles. However, '~unit' is not limited to software or hardware. '~unit' may be configured to reside on an addressable storage medium and configured to reproduce on one or more processors. Accordingly, '~unit' may include, for example, components such as software components, object-oriented software components, class components and task components, processes, functions, attributes, procedures, sub-routines, segments of program code, drivers, firmware, microcode, circuitry, data, databases, data structures, tables, arrays, and variables. The functionalities provided in the components and '~unit' may be combined to fewer components and '~units' or may be further separated into additional components and '~units'. Further, the components and '~units' may be implemented to reproduce one or more central processing units (CPUs) within a device or a security multimedia card. Also, '~unit' in one embodiment may include one or more processors.

In describing the disclosure, if it is determined that a detailed description of a related function or configuration may unnecessarily obscure the subject matter of the disclosure, the detailed description thereof will be omitted. Hereafter, an embodiment of the disclosure will be described in detail with reference to the accompanying drawings.

Hereafter, in the following description, terms for identifying access nodes, terms indicating network entities, terms indicating messages, terms indicating interfaces between network entities, terms indicating various identification information, and the like are illustratively used for the sake of convenience. Accordingly, the disclosure is not limited by the terms to be used, and other terms indicating subjects having equivalent technical meanings may be used.

In the following description, a physical channel and a signal may be used interchangeably with data or a control signal. For example, a physical downlink shared channel (PDSCH) is a term indicating a physical channel carrying data, but the PDSCH may also be used to indicate the data. That is, in the disclosure, the expression 'transmitting the physical channel' may be interpreted equivalently to the expression 'transmitting data or a signal on the physical channel'.

Hereinafter, in the disclosure, higher signaling indicates a signal transmission method transmitted from a base station to a terminal using a downlink data channel of the physical layer, or from a terminal to a base station using an uplink data channel of the physical layer. The higher signaling may be understood as radio resource control (RRC) signaling or media access control (MAC) control element (CE).

Hereafter, for convenience of description, the disclosure uses terms and names defined in 3rd generation partnership project (3GPP) new radio (NR) or 3GPP long term evolution (LTE) standard. However, the disclosure is not limited by the terms and names, and may be applied equally to systems conforming to other standards. That is, a gNodeB (gNB) may be used interchangeably with an eNode B (eNB) in the disclosure to ease the description. That is, the base station described as the eNB may indicate the gNB. In addition, the terminal may indicate a mobile phone, a machine type communication (MTC) device, a narrowband (NB)-internet of things (IoT) device, a sensor or other wireless communication devices.

Hereafter, the base station, which performs resource allocation of the terminal, may be at least one of, but not limited to, a gNB, an eNB, a NodeB, a base station (BS), a radio access unit, a base station controller, or a node on a network. The terminal may include, but not limited to, a user equipment (UE), a mobile station (MS), a cellular phone, a smart phone, a computer, or a multimedia system for performing a communication function.

In describing the disclosure, if it is determined that a detailed description of a related function or configuration may unnecessarily obscure the subject matter of the disclosure, the detailed description thereof will be omitted. Hereafter, an embodiment of the disclosure will be described in detail with reference to the accompanying drawings.

FIG. 1 is a diagram illustrating multicast and broadcast service (MBS) communication operations according to an embodiment of the disclosure.

The MBS communication indicates a communication scheme between one transmitter and multiple receivers in a mobile communication system. Herein, the transmitter may be the base station, and each receiver may be the terminal. However, it is not limited thereto and the transmitter may be the terminal.

The embodiment of FIG. 1 illustrates the MBS communication if a base station 110 is the transmitter and terminals 120, 130, 140, and 150 are receivers. The MBS communication may be broadcast for a plurality of unspecified receivers, or may be multicast for a plurality of specific receivers. If the communication is performed in the multicast scheme, the base station may configure a corresponding multicast packet to be received at only a specific terminal. For doing so, a set of terminals for specific multicast communication may be configured, and is referred to as a multicast group 170 in the embodiment of FIG. 1. By contrast, one-to-one communication between the base station and the terminal is referred to as unicast.

Terminals in the multicast group may be allocated the same separate group-radio network temporary identity (G-RNTI), to thus receive data allocated with the G-RNTI. This G-RNTI is RNTI shared by the terminals in the multicast group, and the terminals allocated the G-RNTI may receive a radio resource for the MBS service from the base station. The embodiment of FIG. 1 assumes that the first terminal 120, the second terminal 130, the third terminal 140, and the fourth terminal 150 are configured as one multicast group and are allocated the G-RNTI to receive data from the base station 110 in the multicast scheme. The fifth terminal 160, which is not included in the multicast group, is not allocated the G-RNTI and accordingly may not receive the data received by the first terminal 120, the second terminal 130, and the third terminal 140 from the base station.

One or more multicast groups may be configured in coverage of the base station 110, and each multicast group may be distinguished by the G-RNTI. One terminal may be allocated one or more G-RNTIs from the base station 110. In an RRC idle mode or an RRC inactive mode as well as an RRC connected mode, the terminal may receive multicast data using a G-RNTI value allocated in the RRC connected mode. The G-RNTI may be included and configured in at least one message of an RRC reconfiguration message, an RRC setup message, and an RRC re-establishment message in the RRC connected mode of the terminal. However, the G-RNTI is not limited thereto, and may be included in a system information block (SIB) as the G-RNTI value receivable by the terminal and transmitted from the base station. The terminal allocated the G-RNTI value may apply the G-RNTI thereafter.

If the base station is to perform the multicast in the RRC connected mode or to transmit configuration information for multicast communication including the G-RNTI to terminals in the RRC connected mode, it may be necessary to transit the terminals of the multicast group to the RRC connected mode. The embodiment of FIG. 1 illustrates that, among the terminals in the multicast group 170, only the first terminal 120 is in the RRC connected mode, the second terminal 130 and the third terminal 140 are in the RRC inactive mode, and the fourth terminal 150 is in the RRC idle mode. In this case, to inform the terminal in the RRC inactive mode or the RRC idle mode of the transition to the RRC connected mode, the base station may transmit a group notification message to the terminals of the group. Since such group notification is commonly transmitted to the terminals of the multicast group, it is advantageous in less resource consumption than paging separately transmitted to the individual terminal. Such group notification may be transmitted through group paging which transmits paging commonly to the group.

The terminal receiving the group notification may perform a random access (RA) procedure which is an initial access procedure for the base station 110, to transit to the RRC connected mode. The RA procedure may be initiated by transmitting an RA preamble of a physical random access channel (PRACH) pre-configured by the base station and notifying the base station of the access attempt. The RA procedure may be divided into 4-step RA and 2-step RA, depending on a message exchange procedure. The RA procedure may be divided into contention-based RA (CBRA) performed by an unspecified terminal and a contention-free RA (CFRA) allowing a specific terminal to transmit a dedicated RA preamble. Since the terminals received group notification are unspecified number of terminals that may be in the base station coverage, the RA performed by the terminals after receiving the group notification may be the CBRA.

Figure 2:
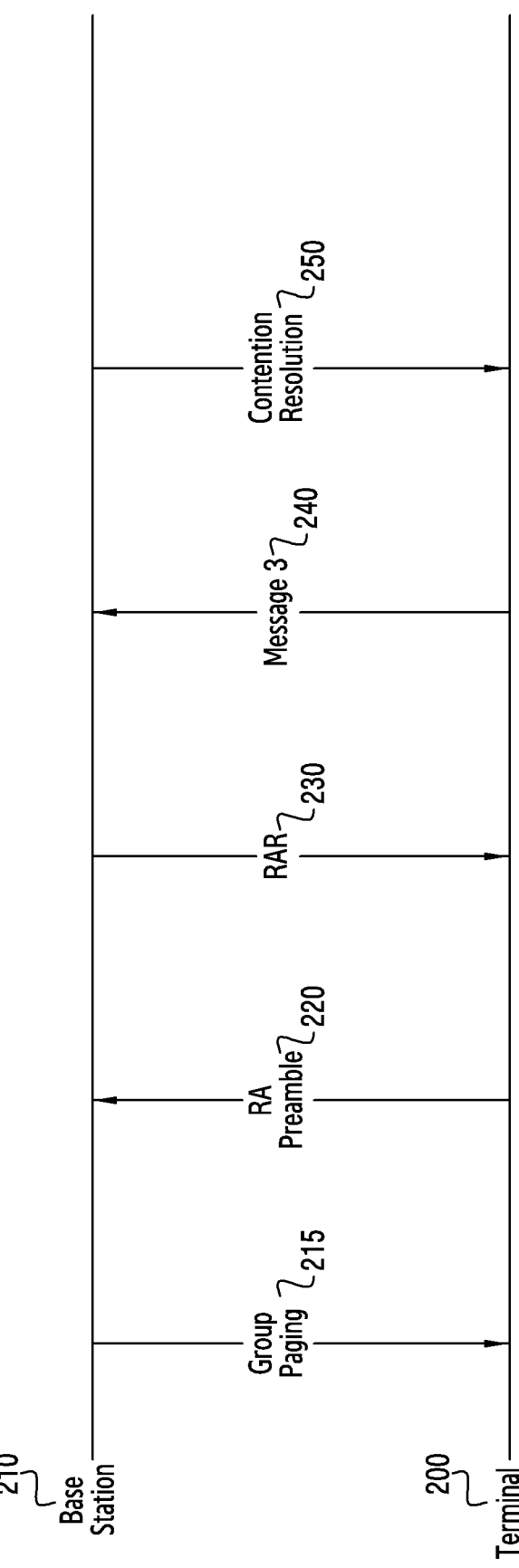
FIG. 2 is a diagram illustrating a 4-step random access procedure performed after receiving group notification according to an embodiment of the disclosure.

FIG. 2 is a diagram illustrating a 4-step RA procedure performed after receiving group notification according to an embodiment of the disclosure.

If a terminal 200 of a multicast group is in the RRC idle mode or the RRC inactive mode, a base station 210 may transmit group notification to transit the terminal into the RRC connected mode, thus receiving multicast data or multicast related configuration information. The embodiment of FIG. 2 assumes that the group notification is transmitted as group paging 215 which may be commonly received at the terminal in the multicast group. The terminal which receives the group paging and needs to transit to the connected mode may perform the RA procedure which is the initial access procedure for the base station 210. The RA procedure may be initiated by transmitting an RA preamble 220 of the PRACH pre-configured by the base station and notifying the base station of the access attempt. The embodiment of FIG. 2 illustrates that the terminal performs the 4-step CBRA. In other words, the base station may transmit the RA preamble configured in advance for an arbitrary terminal, but the same RA preambles simultaneously transmitted by two or more terminals may collide. The base station detecting the RA preamble transmitted by the terminal may transmit an RA response (RAR) message 230 to the terminal and thus allocate a transmission resource for a message3 240 to be transmitted by the terminal, and transmit a timing advance (TA) value for time synchronization of the terminal and the base station. Next, the terminal may include an RRA connection request message into the message3 240 and request the base station to transit to the RRC connected mode. Since two or more different terminals may transmit messages in the transmission resource of the message3 in the CBRA, the base station may need to notify the terminal of which terminal transmits the message to the base station. For doing so, the base station may transmit a contention resolution message 250 by duplicating the received message3 therein, and thus notify that the terminal transmitting the same message3 succeeds in the RA. If content of the message3 included in the contention resolution message is different from the message3 transmitted by the terminal, this may be recognized as RA failure and the RA should be performed again. The contention resolution message may include an RRC connection setup message for the terminal to transit to the RRC connected mode. Next, the terminal may transit to the RRC connected mode.

Figure 3:
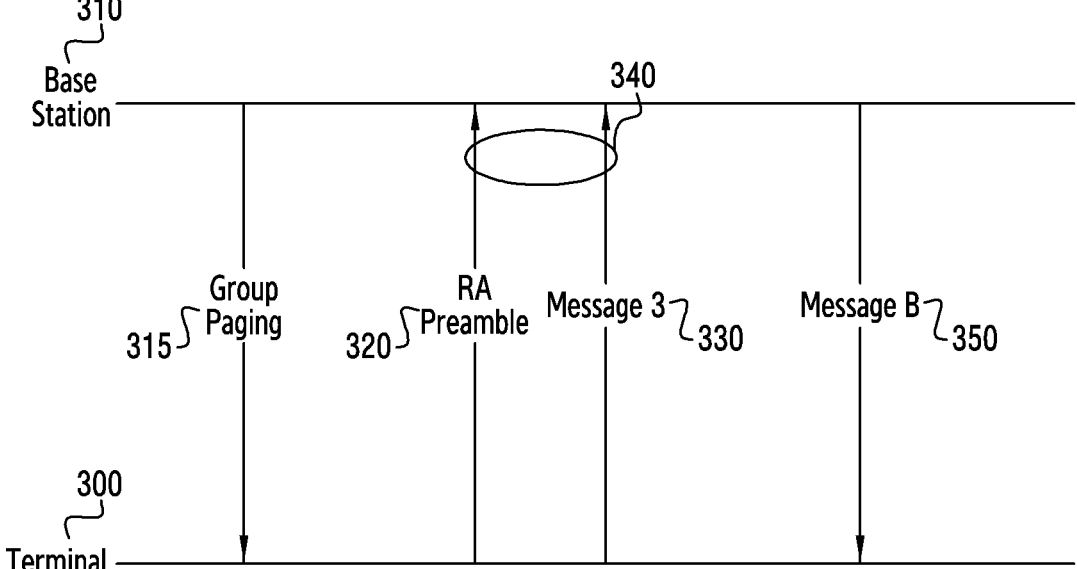
FIG. 3 is a diagram illustrating a 2-step random access procedure performed after receiving group notification according to an embodiment of the disclosure.

FIG. 3 is a diagram illustrating a 2-step RA procedure performed after receiving group notification according to an embodiment of the disclosure.

If a terminal 300 of a multicast group is in the RRC idle mode or the RRC inactive mode, a base station 310 may transmit group notification to allow the terminal to transit to the RRC connected mode, thus receiving multicast data or multicast related configuration information. The embodiment of FIG. 3 assumes that the group notification is transmitted as group paging 315 which may be commonly received at the terminal in the multicast group. The terminal which receives the group paging and needs to transit to the connected mode may perform the RA procedure which is the initial access procedure for the base station 310. The RA procedure may be initiated by transmitting an RA preamble 320 of the PRACH pre-configured by the base station and notifying the base station of the access attempt. The embodiment of FIG. 3 illustrates that the terminal performs the 2-step CBRA. In other words, the base station may transmit the RA preamble configured in advance for an arbitrary terminal and a message3, but the same RA preambles and messages3 simultaneously transmitted by two or more terminals may collide. In the 2-step RA, the terminal transmits both the RA preamble 320 and a message3 330. The RA preamble and the message3 transmitted in the 2-step RA may be referred to as a message A 340. The terminal may include an RRA connection request (e.g., message A 340) into the message3 and request the base station to transit to the RRC connected mode. The base station detecting the RA preamble and the message3 transmitted by the terminal may transmit a TA value for time synchronization of the terminal and the base station by transmitting a messageB 350 to the terminal, duplicate and transmit the received message3 to the terminal, and thus notify that the terminal transmitting the same message3 succeeds in the RA. If content of the message3 included in the messageB is different from the message3 transmitted by the terminal, this may be recognized as RA failure and the RA should be performed again. The messageB may include an RRC connection setup message for the terminal to transit to the RRC connected mode. Next, the terminal may transit to the RRC connected mode.

Figure 4:
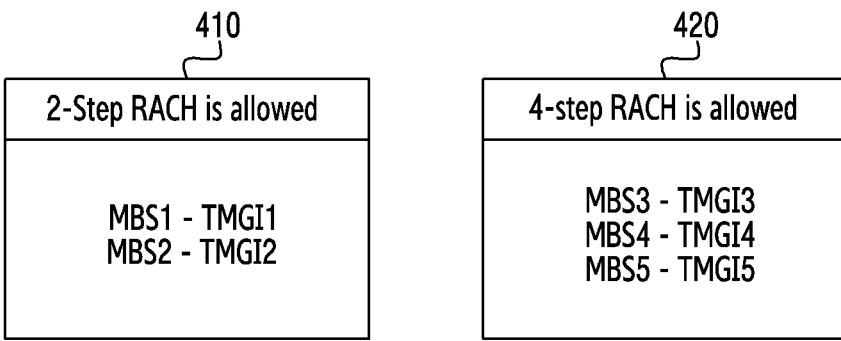
FIG. 4 is a diagram illustrating a method for performing random access per service according to an embodiment of the disclosure.

FIG. 4 is a diagram illustrating a method for performing RA per service according to an embodiment of the disclosure.

A service provided in MBS communication may be divided into MBS sessions and may use temporary mobile group identity (TMGI) as an MBS session identifier (ID). Specifically, the TMGI may include a public land mobile network (PLMN) ID and a service ID. If a terminal of a multicast group is in the RRC idle mode or the RRC inactive mode, a base station may transmit group notification to allow the terminal to transit to the RRC connected mode, thus receiving multicast data or multicast related configuration information. Such group notification may be transmitted through group paging which transmits paging commonly to the group. If the terminal receiving the group notification performs the RA to transit to the connected mode, whether to perform the 2-step RA or the 4-step RA may be determined depending on the MBS service of the group notification. The embodiment of FIG. 4 performs 2-step RA 410 for the group notification (group notification including TMGI1 and TMGI2) for an MBS service1 and an MBS service2 corresponding to TMGI1 and TMGI2, and performs 4-step RA 420 for the group notification (group notification including TMGI3, TMGI4 and TMGI5) for an MBS service3, an MBS service4, and an MBS service5 corresponding to TMGI3, TMGI4 and TMGI5. The base station may configure which MBS service (TMGI) uses the 2-step RA, and which MBS service uses the 4-step RA. Such configuration may be performed by one of system information block (SIB), RRC reconfiguration, downlink control information (DCI) transmitted on a physical downlink control channel (PDCCH), or user service description (USD). In some embodiment, only an MBS service list for the 2-step RA may be transmitted to the terminal, and the 4-step RA may be performed on an MBS service not transmitted. The 2-step RA has a short RA time, but may degrade in resource efficiency due to radio resource pre-reservation. Hence, it is performed only on an MBS service requiring short delay.

Besides, if the terminal of the multicast group is in the RRC idle mode or the RRC inactive mode, it may transit to the RRC connected mode and transmit an MBS interest indication (MII) message, to request the base station to receive a specific MBS service or to notify of MBS service list change which the terminal is interested in. If the MII message is triggered and the terminal performs the RA to transit to the RRC connected mode, whether to perform the 2-step RA or the 4-step RA may be determined according to which MBS service triggers MII reporting. Depending on the configuration of the RA per TMGI as mentioned in FIG. 4, the terminal may perform the 2-step RA or the 4-step RA.

Figure 5:
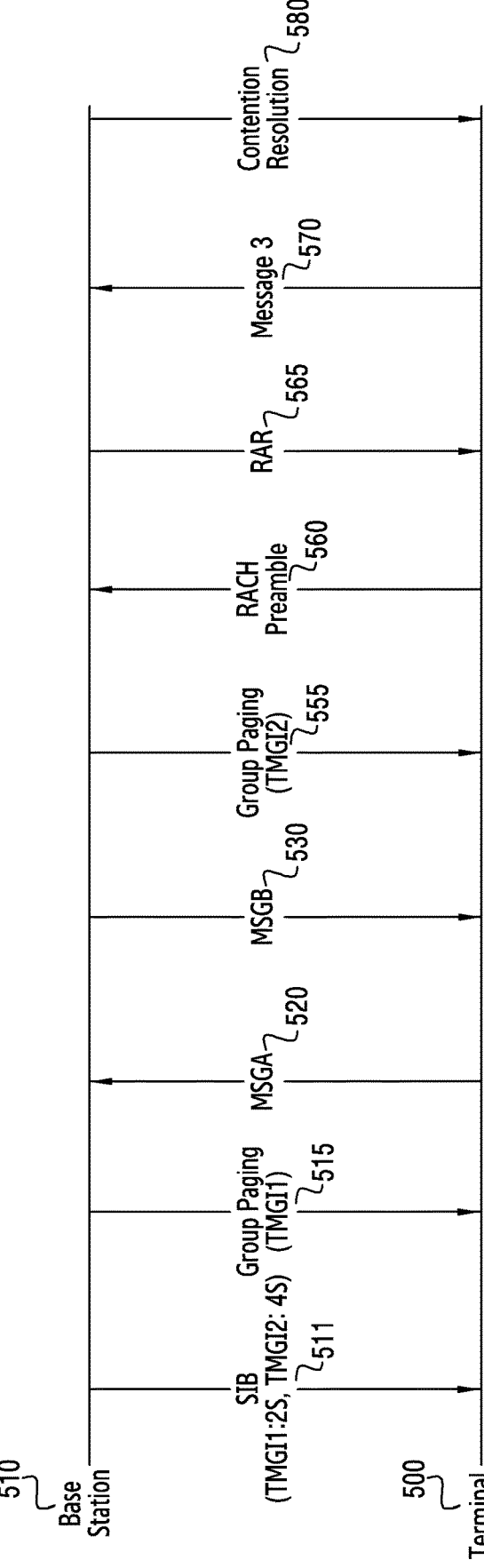
FIG. 5 is a diagram illustrating operations for performing random access per service according to an embodiment of the disclosure.

FIG. 5 is a diagram illustrating RA per service according to an embodiment of the disclosure.

A service provided in the MBS communication may be divided into MBS sessions, and may use the TMGI as the MBS session ID. Specifically, the TMGI may include the PLMN ID and the service ID. If a terminal of a multicast group is in the RRC idle mode or the RRC inactive mode, a base station may transmit group notification to allow the terminal to transit to the RRC connected mode, thus receiving multicast data or multicast related configuration information. Such group notification may be transmitted through group paging which transmits paging commonly to the group. If the terminal receiving the group notification performs the RA to transit to the RRC connected mode, whether to perform the 2-step RA or the 4-step RA may be determined depending on the MBS service of the group notification. The embodiment of FIG. 5 assumes that an MBS service corresponding to TMGI1 uses the 2-step RA after the group notification, and an MBS service corresponding to TMGI2 uses the 4-step RA after the group notification in an SIB message 511 transmitted from a base station 510 to a terminal 500. The message transmitted from the base station to the terminal may indicate which RA scheme to use for RA after group notification of which MBS service. Thus, the terminal may transit to the RRC connected mode by using the allowed RA scheme. The embodiment of FIG. 5 assumes that the group notification is transmitted as the group paging. Group paging 515 for TMGI1 is transmitted to the terminal and the terminal, which is included in the multicast group of the TMGI1, may transit to the RRC connected mode. Since the MBS service corresponding to the TMGI1 is configured to perform the 2-step RAM after the group notification, the terminal may transmit a messageA (MSGA) 520 carrying an RA preamble and a message3 to the base station. The base station may perform RRC connection setup 530 by transmitting a messageB after receiving the messageA from the terminal. Next, after the terminal returns to the RRC idle mode or the RRC inactive mode, group paging for TMGI2 is transmitted to the terminal and the terminal, which is included in the multicast group of the TMGI2, may transit to the RRC connected mode 555. Since the MBS service corresponding to the TMGI2 is configured to perform the 4-step RA after the group notification, the terminal may first transmit an RA preamble 560 to the base station, receive a RA response (RAR) message 565 from the base station, transmit a message3 570 using a radio resource configured and included in the RAR message, and perform RRC connection setup upon receiving a contention resolution message 580.

Figure 6:
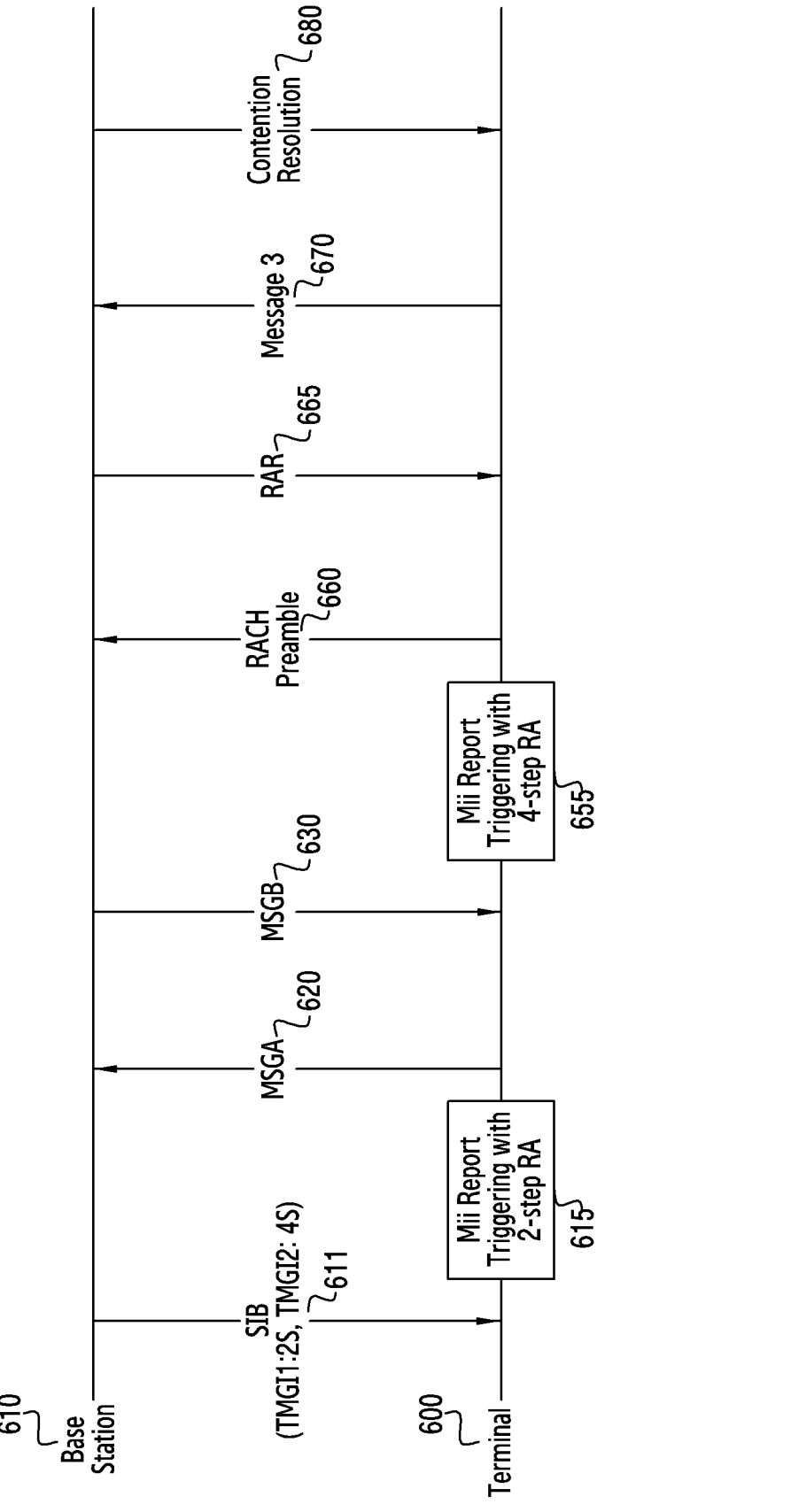
FIG. 6 is a diagram illustrating operations for performing random access per service according to an embodiment of the disclosure.

FIG. 6 is a diagram illustrating operations for performing RA per service according to an embodiment of the disclosure.

A service provided in the MBS communication may be divided into MBS sessions, and may use the TMGI as the MBS session ID. Specifically, the TMGI may include the PLMN ID and the service ID. If a terminal of a multicast group is in the RRC idle mode or the RRC inactive mode, the terminal may transit to the RRC connected mode and transmit a MII message to request the base station to receive a specific MBS service or to notify of MBS service list change which the terminal is interested in. If the MII message is triggered and the terminal performs the RA to transit to the RRC connected mode, whether to perform the 2-step RA or the 4-step RA may be determined according to which MBS service triggers MII reporting. The embodiment of FIG. 6 assumes that an MBS service corresponding to TMGI1 uses the 2-step RA after the MII message is triggered, and an MBS service corresponding to TMGI2 uses the 4-step RA after the MII message is triggered in a SIB message 611 transmitted from a base station 610 to a terminal 600. The message transmitted from the base station to the terminal may indicate which RA scheme to use for RA after the MII message for which MBS service is triggered. Thus, the terminal may transit to the RRC connected mode by using the allowed RA scheme. In operation 615, MII report message transmission for the TMGI1 is triggered, and the terminal, which is included in the multicast group of the TMGI1, may transit to the RRC connected mode. Since the MBS service corresponding to the TMGI1 is configured to perform the 2-step RAM after the MII report triggering, the terminal may transmit a MSGA 620 carrying both a RA preamble and a message3 to the base station. After receiving the messageA from the terminal, the base station may transmit a messageB 630 and perform RRC connection setup. Next, after the terminal 600 returns to the RRC idle mode or the RRC inactive mode, a MII message for TMGI2 is triggered and the terminal, which is included in the multicast group of the TMGI2, may transit to the RRC connected mode in operation 655. Since the MBS service corresponding to the TMGI2 is configured to perform the 4-step RAM after the MII message is triggered, the terminal may first transmit a RA preamble 660 to the base station, receive a RAR message 665 from the base station, transmit a message3 670 using a radio resource configured and included in the RAR message, and perform RRC connection setup upon receiving a contention resolution message 680.

Figure 7:
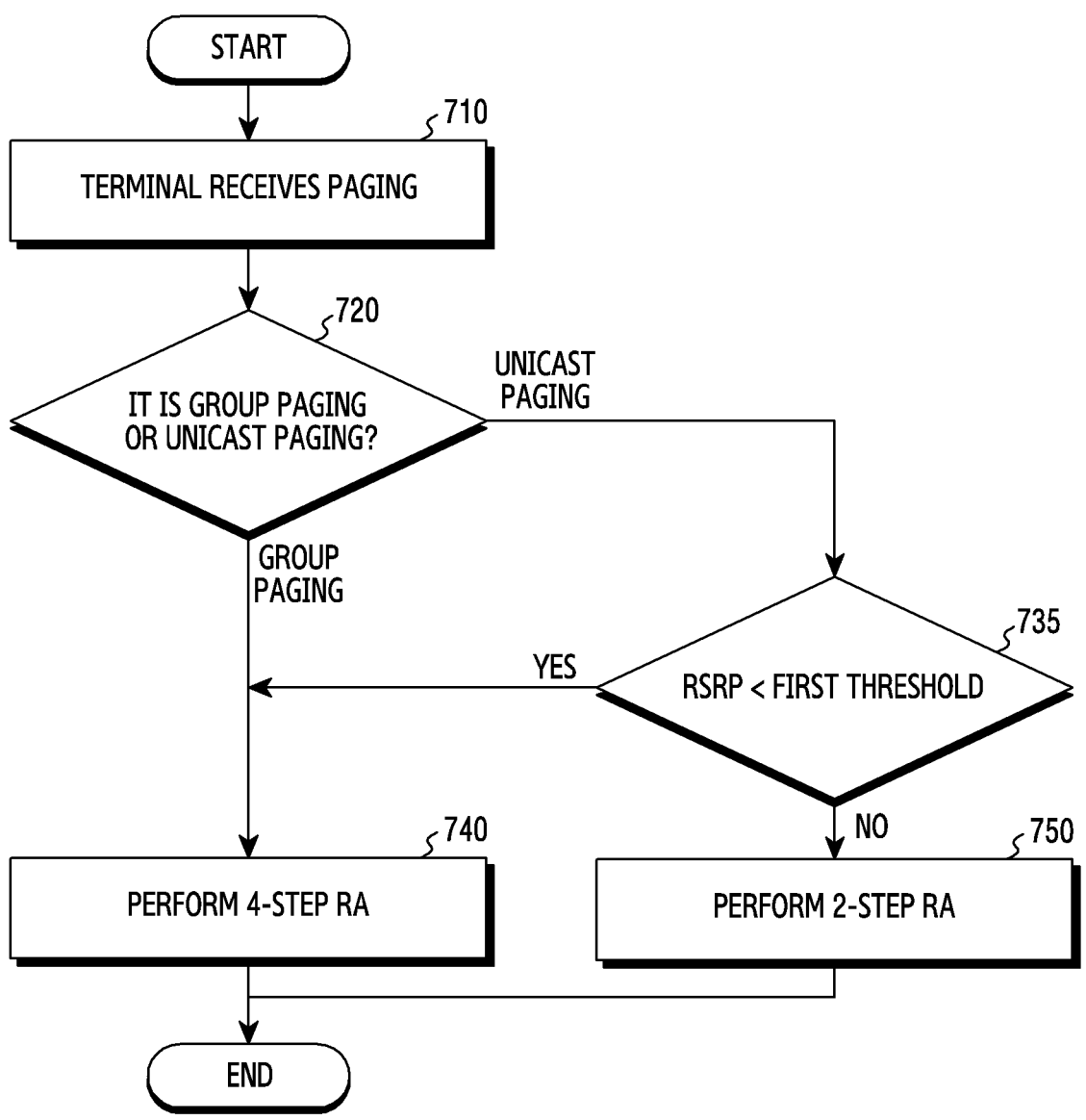
FIG. 7 is a diagram illustrating a method for performing random access according to an embodiment of the disclosure.

FIG. 7 is a diagram illustrating a method for performing RA according to an embodiment of the disclosure.

If a terminal of a multicast group is in the RRC idle mode or the RRC inactive mode, a base station may transmit group notification to allow the terminal to transit to the RRC connected mode, thus receiving multicast data or multicast related configuration information. Such group notification may be transmitted through group paging which transmits paging common to the group. Besides, if a terminal of a multicast group is in the RRC idle mode or the RRC inactive mode, the terminal may transit to the RRC connected mode and transmit a MII message to request the base station to receive a specific MBS service or to notify of MBS service list change which the terminal is interested in. The terminal in the RRC idle mode or the RRC inactive mode needs to perform synchronization and RRC connection with the base station to transit to the RRC connected mode, for which the RA is performed.

Since the 2-step RA is low in radio resource efficiency due to the radio resource pre-reservation compared to the 4-step RA, the 2-step RA may waste RA resources due to the MBS service. Hence, if the base station operates the 4-step RA and the 2-step RA at the same time, it may be necessary to limit the 2-step random to the unicast. That is, the CBRA based on the group notification or the MII message triggering may perform the 4-step RA regardless of whether the 2-step RA resource is configured.

The embodiment of FIG. 7 assumes that the terminal receives a paging message from the base station in operation 710 and needs to transit to the RRC connected mode. The terminal may identify whether the received paging message is a group paging message or a unicast paging message in operation 720. For the group paging requiring the RRC connected mode transition for the MBS service, the terminal may perform the access procedure using the 4-step RA in operation 740 regardless of whether the 2-step RA is configured. In so doing, the terminal may initiate the RA by using a RA preamble configured for the 4-step RA (transmitting the RA preamble configured for the 4-step RA). If the received paging message is the unicast paging message in operation 720, the terminal may perform the 2-step RA or the 4-step RA, depending on a current received signal received power (RSRP) value in operation 735. For doing so, a first threshold may be set, and the terminal may perform the access procedure using the 4-step RA in operation 740 if the RSRP of the terminal is below the first threshold. The first threshold may be configured for the terminal by the base station using a SIB or a previous RRC configuration message or RRC release message. The terminal may initiate the RA by using a RA preamble configured for the 4-step RA (transmitting the RA preamble configured for the 4-step RA). If the RSRP of the terminal is greater than the first threshold in operation 735, the terminal may perform the access procedure using the 2-step RA in operation 750. In so doing, the terminal may initiate the RA by using a RA preamble configured for the 2-step RA (transmitting the RA preamble configured for the 2-step RA). In the 2-step RA, a message3 may be also transmitted, and the RA preamble and the message3 may be referred to as messageA transmission.

The embodiment of FIG. 7 illustrates the method for using the 4-step RA only in the group paging, but may be also extended and applied to any CBRA triggered by the MBS. For example, the 4-step RA may be used always in the RA based on the MII message triggering.

Figure 8:
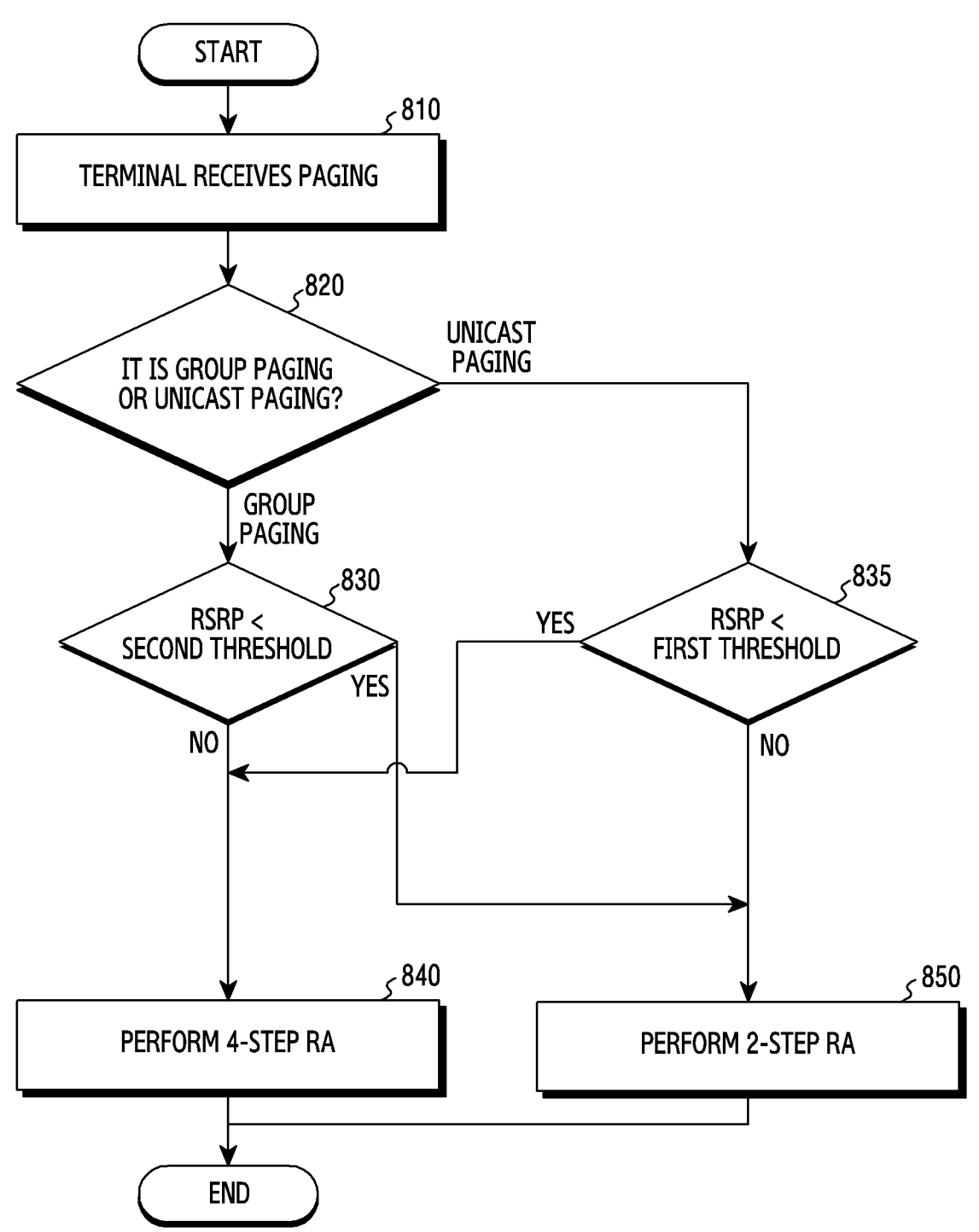
FIG. 8 is a diagram illustrating a method for performing random access according to an embodiment of the disclosure.

FIG. 8 is a diagram illustrating a method for performing RA according to an embodiment of the disclosure.

If a terminal of a multicast group is in the RRC idle mode or the RRC inactive mode, a base station may transmit group notification to allow the terminal to transit to the RRC connected mode, thus receiving multicast data or multicast related configuration information. Such group notification may be transmitted through group paging which transmits paging common to the group. Besides, if the terminal of the multicast group is in the RRC idle mode or the RRC inactive mode, the terminal may transit to the RRC connected mode and transmit a MII message to request the base station to receive a specific MBS service or to notify of MBS service list change which the terminal is interested in. The terminal in the RRC idle mode or the RRC inactive mode may perform synchronization and RRC connection with the base station to transit to the RRC connected mode, for which the RA is performed.

Since the 2-step RA is low in radio resource efficiency due to the radio resource pre-reservation compared to the 4-step RA, the 2-step RA may waste RA resources due to the MBS service. Hence, if operating the 4-step RA and the 2-step RA at the same time, the base station may set a condition for performing the RA triggered by the MBS. That is, the CBRA by the group notification or the MII message triggering may determine whether to perform the 4-step RA or the 2-step RA by comparing the terminal RSRP with a second threshold.

The embodiment of FIG. 8 assumes that the terminal receives a paging message from the base station in operation 810 and needs to transit to the RRC connected mode. The terminal may identify whether the received paging message is a group paging message or a unicast paging message in operation 820. For the group paging requiring the RRC connected mode transition for the MBS service, the terminal may perform the 2-step RA or the 4-step RA according to a current RSRP value in operation 830. For doing so, the second threshold may be set, and the terminal may perform the access procedure using the 4-step RA in operation 840 if the RSRP of the terminal is below the second threshold. The second threshold may be configured for the terminal by the base station using a SIB or a previous RRC configuration message or RRC release message. The terminal may initiate the RA by using a RA preamble configured for the 4-step RA (transmitting the RA preamble configured for the 4-step RA). If the RSRP of the terminal is greater than the second threshold in operation 830, the terminal may perform the access procedure using the 2-step RA in operation 850. The terminal may initiate the RA by using a RA preamble configured for the 2-step RA (transmitting the RA preamble configured for the 2-step RA). In the 2-step RA, a message3 may be also transmitted, and the RA preamble and the message3 may be referred to as messageA transmission. If the received paging message is the unicast paging message in operation 820, the terminal may perform the 2-step RA or the 4-step RA, depending on the current RSRP value in operation 835. For doing so, a first threshold may be set, and the terminal may perform the access procedure using the 4-step RA in operation 840 if the RSRP of the terminal is below the first threshold. The first threshold may be configured for the terminal by the base station using a SIB or a previous RRC configuration message or RRC release message. The terminal may initiate the RA by using a RA preamble configured for the 4-step RA (transmitting the RA preamble configured for the 4-step RA). If the RSRP of the terminal is greater than the first threshold in operation 835, the terminal may perform the access procedure using the 2-step RA in operation 850. The terminal may initiate the RA by using a RA preamble configured for the 2-step RA (transmitting the RA preamble configured for the 2-step RA). In the 2-step RA, a message3 may be also transmitted, and the RA preamble and the message3 may be referred to as the messageA transmission.

The embodiment of FIG. 8 illustrates the method for performing the 4-step RA or the 2-step RA by comparing the RSRP value with the second threshold only in the group paging, but may be extended and applied to every CBRA triggered by the MBS. For example, in the RA by the MII message triggering, if the terminal RSRP value is compared with the second threshold and is smaller than the second threshold, the 2-step RA may be used, and otherwise, the 4-step RA may be used.

Figure 9:
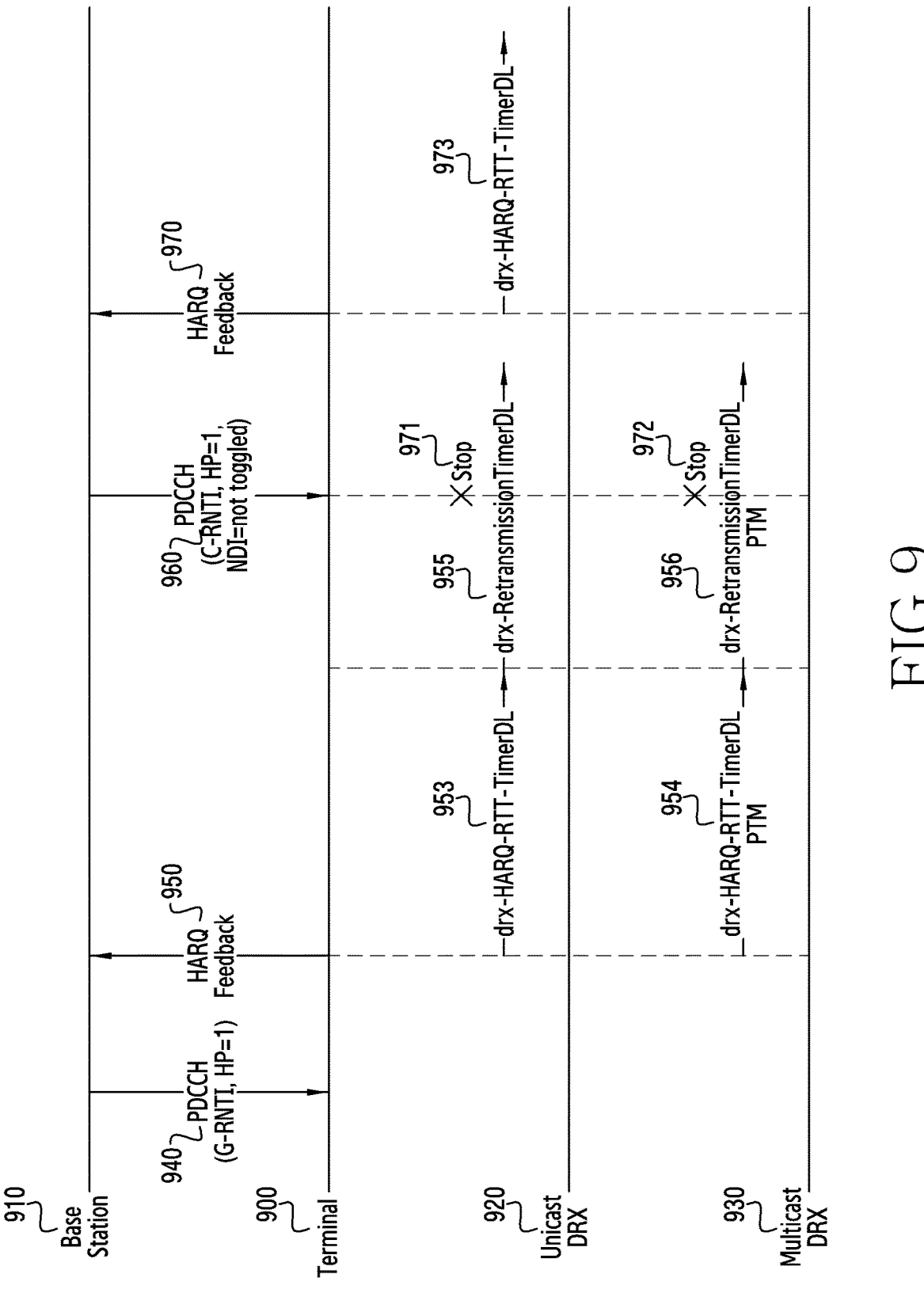
FIG. 9 is a diagram illustrating a discontinuous reception (DRX) operation method according to an embodiment of the disclosure.

FIG. 9 is a diagram illustrating a discontinuous reception (DRX) operation method according to an embodiment of the disclosure.

Since a terminal 900 operates using a battery without separate external power supply in a wireless communication system, it is important to reduce its power consumption. For doing so, a DRX operation in which the terminal does not perform unnecessary transmission or reception if there is no data transmission or reception may be defined. The DRX operation may separately configure the unicast and the multicast, the terminal may perform PDCCH monitoring for the unicast in an active time of the unicast DRX, and perform PDCCH monitoring on G-RNTI/G-configured scheduling (CS)-RNTI for corresponding multicast in an active time of the multicast DRX. The active time of the DRX may be defined as a time for operating an on-duration timer of the DRX, a DRX inactivity timer, or a DRX retransmission timer (drx-RetransmissionTimerDL and drx-RetransmissionTimerUL of the unicast DRX, drx-RetransmissionTimerDL-PTM of the multicast DRX). The unicast DRX and the multicast DRX may be separately configured, but may have dependence because retransmission of point-to-multipoint (PTM) initial transmission transmitted using the G-RNTI may be transmitted to a specific terminal using connection (C)-RNTI in a point-to-point (PTP) manner.

The embodiment of FIG. 9 assumes that the terminal configures both unicast DRX 920 and multicast DRX 930. Since the multicast DRX may be configured per G-RNTI, a plurality of multicast G-RNTIs may be configured in one terminal, but the embodiment of FIG. 9 illustrates that one multicast DRX is configured. However, the embodiment of FIG. 9 may be also applied to a plurality of multicast DRXs in the same manner.

In operation 940, a base station 910 allocates a radio resource to the terminal 900 using the G-RNTI via the PDCCH used for the multicast group. In so doing, a hybrid automatic repeat request (HARQ) process (HP) may be designated, and HP=1 is assumed in operation 940. After identifying radio resource allocation information using the G-RNTI, if attempting data reception and transmitting HARQ feedback 950, the terminal 900 may start HARQ RTT timer drx-HARQ-RTT-TimerDL 953 of the unicast DRX and HARQ RTT timer drx-HARQ-RTT-TimerDL-PTM 954 of the multicast DRX configured in the corresponding G-RNTI at a first symbol after the HARQ feedback transmission is finished. If the PDCCH using the G-RNTI indicates downlink transmission, the terminal 900 may stop drx-RetransmissionTimerDL of the ongoing unicast DRX and drx-RetransmissionTimerDLPTM of the multicast DRX configured in the corresponding G-RNTI. If drx-HARQ-RTT-TimerDL expires and data of the corresponding HP is not successfully decoded, the terminal 900 may start drx-RetransmissionTimerDL of the unicast DRX in an operation for drx-RetransmissionTimerDL 955. If drx-HARQ-RTT-TimerDLPTM expires and data of the corresponding HP is not successfully decoded, the terminal 900 may start drx-HARQ-RTT-TimerDLPTM of the multicast DRX in an operation for drx-RetransmissionTimerDLPTM 956.

In operation 960, the base station 910 allocates the terminal 900 with a radio resource using the C-RNTI through the PDCCH used by the terminal 900 for the unicast (or the PTP). At this time, the HP may be designated, and it is assumed that HP=1 is used, and a new data indicator (NDI) value is not changed (not toggled, matches a previous NDI value) in operation 960. This indicates retransmission of transmission using the G-RNTI before the HP of HP=1.

After identifying radio resource allocation information using the C-RNTI, the terminal 900 may attempt data reception and stop the ongoing drx-RetransmissionTimerDL 955 and the ongoing every drx-RetransmissionTimerDLTM 956 in operations 971 and 972. In some embodiment, the terminal 900 may stop only drx-RetransmissionTimerDLPTM 956 of the multicast DRX configured in the G-RNTI used in previous transmission. Stopping both drx-Retransmission-TimerDL 955 of the unicast DRX and drx-Retransmission-TimerDLPTM 956 of the multicast DRX if downlink transmission transmitted with the C-RNTI is indicated may reduce terminal power consumption by terminating the active times of the unicast DRX and the multicast DRX. The terminal 900 attempting to decode downlink data indicated by the PDCCH transmission using the C-RNTI may start HARQ RTT Timer (drx-HARQ-RTT-TimerDL) 973 of the unicast DRX at a first symbol after the HARQ feedback transmission 970 is finished.

Figure 10:
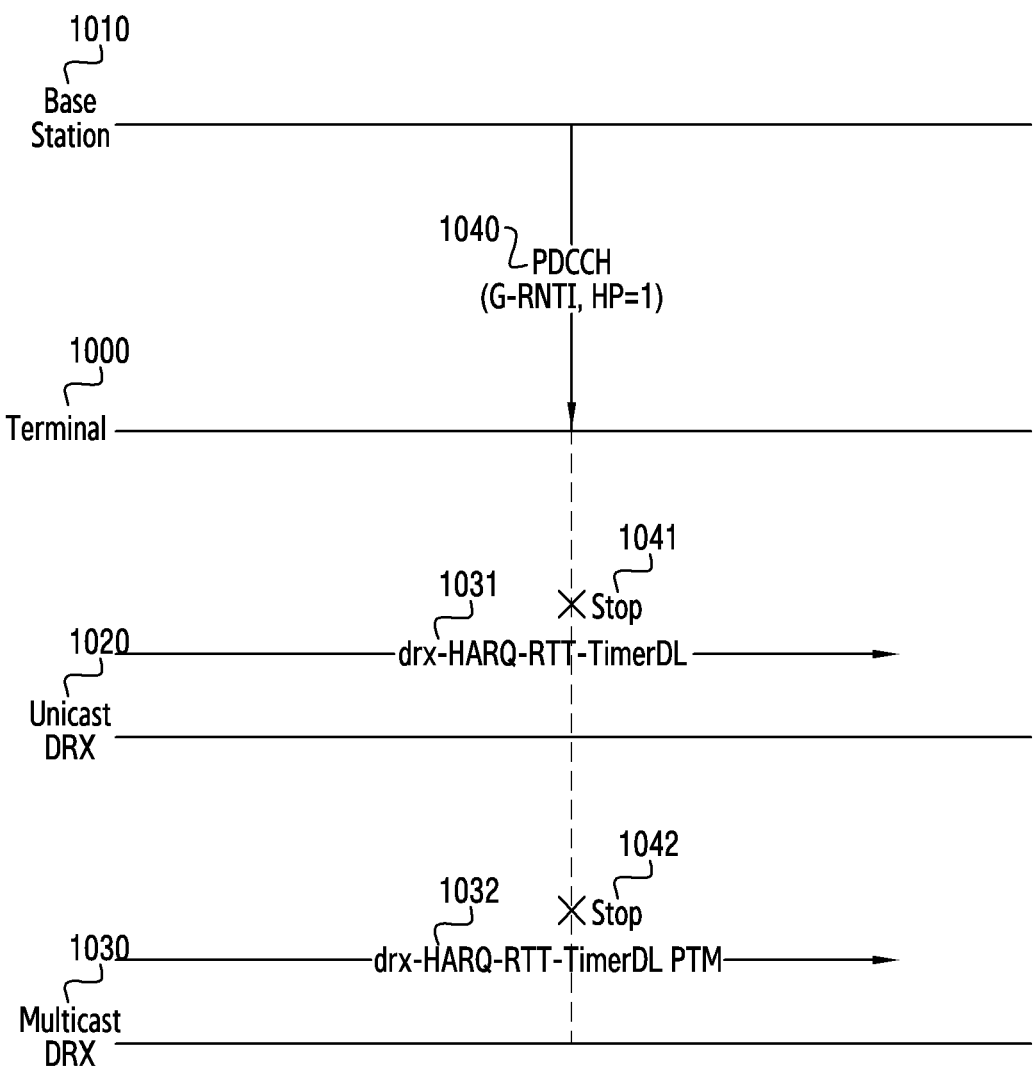
FIG. 10 is a diagram illustrating a DRX operation method according to an embodiment of the disclosure.

FIG. 10 is a diagram illustrating a DRX operation method according to an embodiment of the disclosure.

Since a terminal 1000 operates using a battery without separate external power supply in a wireless communication system, it is important to reduce its power consumption. For doing so, the DRX operation in which the terminal does not perform unnecessary transmission or reception if there is no data transmission or reception may be defined. The DRX operation may separately configure the unicast and the multicast, the terminal may perform PDCCH monitoring for the unicast in the active time of the unicast DRX, and perform PDCCH monitoring on G-RNTI/G-CS-RNTI for corresponding multicast in the active time of the multicast DRX. The active time of the DRX may be defined as the time for operating the on-duration timer of the DRX, the DRX inactivity timer, or the DRX retransmission timer (drx-RetransmissionTimerDL and drx-RetransmissionTimerUL of the unicast DRX, drx-RetransmissionTimerDL-PTM of the multicast DRX). The unicast DRX and the multicast DRX may be separately configured, but may have dependence because retransmission of PTM initial transmission transmitted using the G-RNTI may be transmitted to a specific terminal using the C-RNTI in the PTP manner.

The embodiment of FIG. 10 assumes that the terminal configures both unicast DRX 1020 and multicast DRX 1030. Since the multicast DRX may be configured per G-RNTI, a plurality of multicast G-RNTIs may be configured in one terminal, but the embodiment of FIG. 10 illustrates that one multicast DRX is configured. However, the embodiment of FIG. 10 may be applied to a plurality of multicast DRXs in the same manner.

In operation 1040, a base station 1010 allocates a radio resource to the terminal 1000 using the G-RNTI via the PDCCH used for the multicast group. In so doing, the HP may be designated, and HP=1 is assumed in operation 1040. The radio resource transmission using the G-RNTI may not configure the HARQ feedback. No HARQ feedback configuration may be configured by the RRC message or the DCI. Besides, negative acknowledgement (NACK)-only feedback which transmits only HARQ NACK indicating decoding failure without transmitting HARQ ACK indicating decoding success may not transmit the HARQ feedback due to the successful data decoding. If downlink transmission using the G-RNTI regardless of the HARQ feedback configuration or transmission is indicated, the terminal may attempt to decode corresponding data. At this time, since additional resource allocation to the PDCCH is not expected, the terminal 1000 may stop drx-Retransmission-TimerDL 1031 of the ongoing unicast DRX and drx-RetransmissionTimerDLPTM 1032 of the multicast DRX configured in the corresponding G-RNTI in operations 1041 and 1042. In some embodiment, every drx-RetransmissionTimerDLPTM of the multicast DRX configured in the terminal may be stopped regardless of the G-RNTI used in operation 1040. Stopping both drx-RetransmissionTimerDL 1031 of the unicast DRX and drx-RetransmissionTimerDLPTM 1032 of the multicast DRX if the downlink transmission transmitted with the G-RNTI is indicated may reduce the terminal power consumption by terminating all the active times of the unicast DRX and the multicast DRX.

Figure 11:
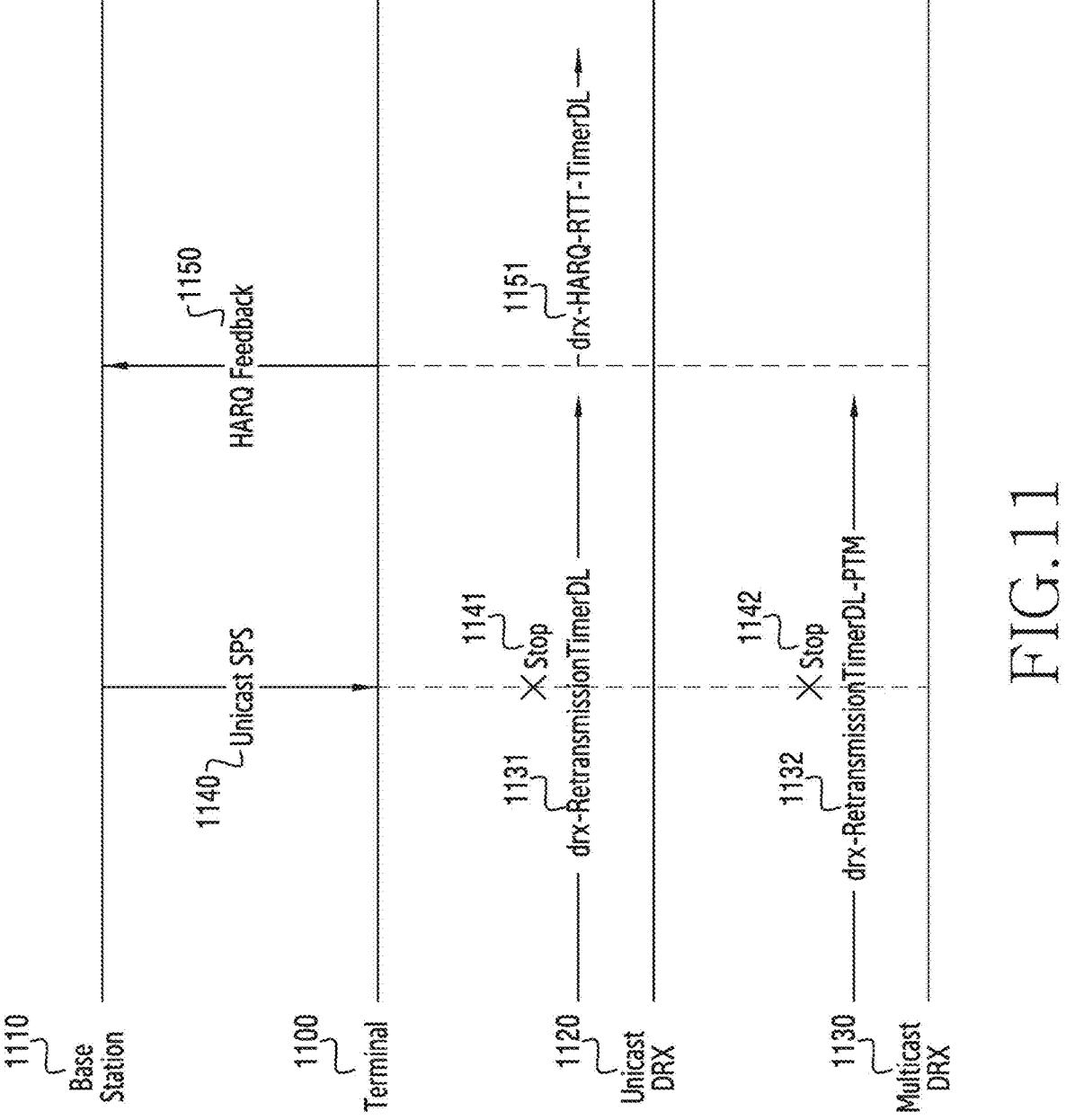
FIG. 11 is a diagram illustrating a DRX operation method according to an embodiment of the disclosure.

FIG. 11 is a diagram illustrating a DRX operation method according to an embodiment of the disclosure.

Since a terminal 1100 operates using a battery without separate external power supply in a wireless communication system, it is important to reduce its power consumption. For doing so, the DRX operation in which the terminal does not perform unnecessary transmission or reception if there is no data transmission or reception may be defined. The DRX operation may separately configure the unicast and the multicast, the terminal may perform the PDCCH monitoring for the unicast in the active time of the unicast DRX, and perform the PDCCH monitoring on G-RNTI/G-CS-RNTI for corresponding multicast in the active time of the multicast DRX. The active time of the corresponding DRX may be defined as a time for operating the on-duration timer of the DRX, the DRX inactivity timer, or the DRX retransmission timer (drx-RetransmissionTimerDL and drx-RetransmissionTimerUL of the unicast DRX, drx-RetransmissionTimerDL-PTM of the multicast DRX). The unicast DRX and the multicast DRX may be separately configured, but may have dependence because retransmission of PTM initial transmission transmitted using the G-RNTI may be transmitted to a specific terminal using the C-RNTI in the PTP manner.

The embodiment of FIG. 11 assumes that the terminal configures both unicast DRX 1120 and multicast DRX 1130. Since the multicast DRX may be configured per G-RNTI, a plurality of multicast G-RNTIs may be configured in one terminal, but the embodiment of FIG. 11 illustrates that one multicast DRX is configured. However, the embodiment of FIG. 11 may be applied to a plurality of multicast DRXs in the same manner.

In operation 1140, a base station 1110 indicates unicast semi-persistent scheduling (SPS) transmission periodically allocated, to the terminal 1100. The SPS may be referred to as 'configured downlink assignment'. At this time, the HP may be configured by an RRC message, and the HP of the SPS transmitted at a specific time may be calculated by the terminal. The terminal 1100 may decode corresponding SPS and then transmit HARQ feedback to the base station 1110 in operation 1150. In so doing, the base station 1110 does not allocate downlink transmission to the same HP. Thus, the terminal 1100 may stop drx-RetransmissionTimerDL 1131 of the ongoing unicast DRX and drx-RetransmissionTimerDLPTM 1132 of the multicast DRX configured in the terminal in operations 1141 and 1142. Stopping both drx-RetransmissionTimerDL 1131 of the unicast DRX and drx-RetransmissionTimerDLPTM 1132 of the multicast DRX if the unicast SPS transmission occurs may reduce the power consumption of the terminal by terminating all the active times of the unicast DRX and the multicast DRX. The terminal 1100 may start HARQ RTT Timer (drx-HARQ-RTT-TimerDL) 1151 of the unicast DRX at a first symbol after the HARQ feedback transmission 1150 is finished.

Figure 12:
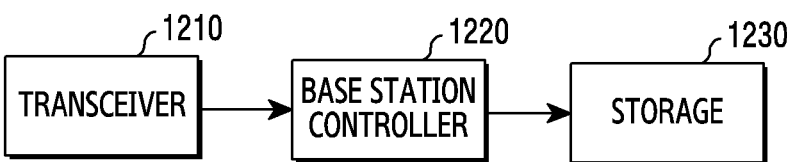
FIG. 12 is a diagram illustrating a structure of a base station according to an embodiment of the disclosure.

FIG. 12 is a diagram illustrating a structure of a base station according to an embodiment of the disclosure.

Referring to FIG. 12, the base station may include a transceiver 1210, a controller 1220, and a storage 1230. In the disclosure, the controller 1220 may be defined as a circuit- or application-specific integrated circuit or at least one processor. The transceiver 1210 may transmit or receive a signal to or from other network entity. The transceiver 1210 may, for example, transmit system information to the terminal, or transmit a synchronization signal or a reference signal. The transceiver 1210 may control general operations of the base station according to an embodiment of the disclosure. For example, the controller 1220 may control the signal flow between the blocks to perform the operations based on the flowchart described above. The storage 1230 may store at least one of information transmitted or received through the transceiver 1210 and information generated through the controller 1220.

Figure 13:
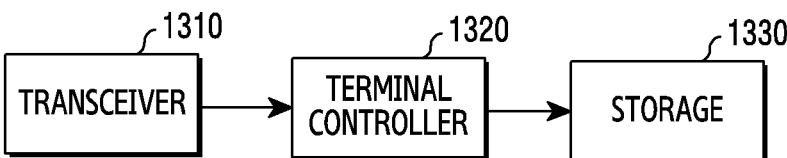
FIG. 13 is a diagram illustrating a structure of a terminal according to an embodiment of the disclosure.

FIG. 13 is a diagram illustrating a structure of a terminal according to an embodiment of the disclosure.

Referring to FIG. 13, the terminal may include a transceiver 1310, a controller 1320, and a storage 1330. In the disclosure, the controller 1320 may be defined as a circuit- or application-specific integrated circuit or at least one processor. The transceiver 1310 may transmit or receive a signal to or from other network entity. The transceiver 1310 may, for example, receive system information from the base station, or receive a synchronization signal or a reference signal. The controller 1320 may control general operations of the terminal according to an embodiment of the disclosure. For example, the controller 1320 may control the signal flow between the blocks to perform operations based on the flowchart described above. The storage 1330 may store at least one of information transmitted or received through the transceiver 1310 and information generated through the controller 1320.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, a digital versatile disc (DVD) or other optical storage device, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the disclosure, the term "computer program product" or "computer-readable medium" is used to collectively indicate media such as a memory, a hard disk installed in a hard disk drive, and a signal. The "computer program product" or "computer-readable medium" is a configuration provided in the method for reporting UE capability in the wireless communication system according to the disclosure.

A machine-readable storage medium may be provided in the form of a non-transitory storage medium. Herein, the term 'non-temporary storage medium' merely indicates that the device is tangible and does not include a signal (e.g., electromagnetic waves), but does not distinguish whether data is permanently or temporarily stored in the storage medium. For example, the 'non-transitory storage medium' may include a buffer for temporarily storing data.

According to an embodiment, the methods according to various embodiments described above may be provided as a part of a computer program product. The computer program product may be traded between a seller and a buyer. The computer program product may be distributed in a form of the machine-readable storage medium (e.g., CD-ROM), or distributed online (e.g., downloaded or uploaded) through an application store (e.g., PlayStore™) or directly between two user devices (e.g., smartphones). In the online distribution, at least a portion of the computer program product (e.g., a downloadable app) may be at least temporarily stored or provisionally generated on the storage medium such as a manufacturer's server, an application store's server, or a memory of a relay server.

In the specific embodiments of the disclosure, the components included in the disclosure are expressed in a singular or plural form. However, the singular or plural expression is appropriately selected according to a proposed situation for the convenience of explanation, the disclosure is not limited to a single component or a plurality of components, the components expressed in the plural form may be configured as a single component, and the components expressed in the singular form may be configured as a plurality of components.

While the disclosure has been shown and described with reference to various embodiments thereof, it will be understood by those skilled in the art that various changes in form and details may be made therein without departing from the spirit and scope of the disclosure as defined by the appended claims and their equivalents.

In addition, the respective embodiments may be combined and operated as needed. For example, portions of one embodiment and another embodiment of the disclosure may be combined with each other to operate the base station and the terminal. Further, the embodiments of the disclosure may be applied to other communication system, and other modifications may be made based on the technical idea of the embodiments. For example, the embodiment is applicable to the LTE system, the 5G, the NR system or a 6th generation (6G) system. Therefore, the scope of the disclosure is not limited and defined by the described embodiment and is defined not only the scope of the claims as below but also their equivalents.

What is claimed is:

1. A method performed by user equipment (UE) in a wireless communication system, the method comprising:
   receiving, from a base station (BS), a unicast related downlink signal scheduled by a semi-persistent scheduling (SPS), in case that a unicast discontinuous reception (DRX) and a multicast DRX are configured;
   stopping a unicast DRX retransmission timer based on the unicast related downlink signal; and stopping a multicast DRX retransmission timer based on the unicast related downlink signal, wherein the unicast DRX retransmission timer and the multicast DRX retransmission timer are stopped if the unicast related downlink signal is identified by monitoring a physical downlink control channel (PDCCH) scrambled with a cell radio network temporary identifier (C-RNTI).

2. The method of claim 1, wherein the unicast DRX retransmission timer and the multicast DRX retransmission timer correspond to a same hybrid automatic repeat request (HARQ) process.

3. The method of claim 1, further comprising:

transmitting, to the BS, a HARQ feedback for the unicast related downlink signal scheduled by the SPS; and starting a unicast DRX HARQ round trip time (RTT) timer based on the HARQ feedback.

4. A user equipment (UE) in a wireless communication system, the UE comprising:

at least one transceiver;

at least one processor communicatively coupled to the at least one transceiver; and at least one memory, communicatively coupled to the at least one processor, storing instructions executable by the at least one processor individually or in any combination to cause the UE to:

receive, from a base station (BS), a unicast related downlink signal scheduled by a semi-persistent scheduling (SPS), in case that a unicast discontinuous reception (DRX) and a multicast DRX are configured, stop a unicast DRX retransmission timer based on the unicast related downlink signal, and stop a multicast DRX retransmission timer based on the unicast related downlink signal, wherein the unicast DRX retransmission timer and the multicast DRX retransmission timer are stopped if the unicast related downlink signal is identified by monitoring a physical downlink control channel (PDCCH) scrambled with a cell radio network temporary identifier (C-RNTI).

5. The UE of claim 4, wherein the unicast DRX retransmission timer and the multicast DRX retransmission timer correspond to a same hybrid automatic repeat request (HARQ) process.

6. The UE of claim 4, wherein the instructions further cause the UE to:

transmit, to the BS, a HARQ feedback for the unicast related downlink signal scheduled by the SPS; and start a unicast DRX HARQ round trip time (RTT) timer based on the HARQ feedback.

7. A method performed by base station (BS) in a wireless communication system, the method comprising:

transmitting, to user equipment (UE), a unicast related downlink signal scheduled by a semi-persistent scheduling (SPS), in case that a unicast discontinuous reception (DRX) and a multicast DRX are configured for the UE, wherein a unicast DRX retransmission timer is stopped based on the unicast related downlink signal, wherein a multicast DRX retransmission timer is stopped based on the unicast related downlink signal, wherein the unicast DRX retransmission timer and the multicast DRX retransmission timer are stopped if the unicast related downlink signal is identified by monitoring a physical downlink control channel (PDCCH) scrambled with a cell radio network temporary identifier (C-RNTI).

8. The method of claim 7, wherein the unicast DRX retransmission timer and the multicast DRX retransmission timer correspond to a same hybrid automatic repeat request (HARQ) process.

9. The method of claim 7, further comprising:

receiving, from the UE, a HARQ feedback for the unicast related downlink signal scheduled by the SPS, wherein a unicast DRX HARQ round trip time (RTT) timer is started based on the HARQ feedback.

10. A base station (BS) in a wireless communication system, the BS comprising:

at least one transceiver;

at least one processor communicatively coupled to the at least one transceiver; and at least one memory, communicatively coupled to the at least one processor, storing instructions executable by the at least one processor individually or in any combination to cause the BS to:

transmit, to user equipment (UE), a unicast related downlink signal scheduled by a semi-persistent scheduling (SPS), in case that a unicast discontinuous reception (DRX) and a multicast DRX are configured for the UE, wherein a unicast DRX retransmission timer is stopped based on the unicast related downlink signal, wherein a multicast DRX retransmission timer is stopped based on the unicast related downlink signal, wherein the unicast DRX retransmission timer and the multicast DRX retransmission timer are stopped if the unicast related downlink signal is identified by monitoring a physical downlink control channel (PDCCH) scrambled with a cell radio network temporary identifier (C-RNTI).

11. The BS of claim 10, wherein the unicast DRX retransmission timer and the multicast DRX retransmission timer correspond to a same hybrid automatic repeat request (HARQ) process.

12. The BS of claim 10, wherein the at least one processor is further configured to:

receive, from the UE, a HARQ feedback for the unicast related downlink signal scheduled by the SPS, wherein a unicast DRX HARQ round trip time (RTT) timer is started based on the HARQ feedback.

* * * * *